US 8,363,651 B2

(12) United States Patent
Tapie et al.

(10) Patent No.: US 8,363,651 B2
(45) Date of Patent: *Jan. 29, 2013

(54) TIME LABELLING ASSOCIATED WITH AN EQUIPMENT SYNCHRONISATION SYSTEM CONNECTED TO A NETWORK

(75) Inventors: Thierry Tapie, Rennes (FR); Serge Defrance, Rennes (FR); Pierrick Jouet, Rennes (FR)

(73) Assignee: Thomson Licensing (FR)

( * ) Notice: Subject to any disclaimer, the term of this patent is extended or adjusted under 35 U.S.C. 154(b) by 33 days.

This patent is subject to a terminal disclaimer.

(21) Appl. No.: 12/736,566

(22) PCT Filed: Apr. 21, 2009

(86) PCT No.: PCT/EP2009/054731
§ 371 (c)(1),
(2), (4) Date: Oct. 20, 2010

(87) PCT Pub. No.: WO2009/130213
PCT Pub. Date: Oct. 29, 2009

(65) Prior Publication Data
US 2011/0038370 A1   Feb. 17, 2011

(30) Foreign Application Priority Data

Apr. 21, 2008 (FR) ..................................... 08 52687

(51) Int. Cl.
*H04L 12/56* (2006.01)
(52) U.S. Cl. ......... 370/389; 370/224; 370/503; 348/497
(58) Field of Classification Search .......... 370/224–503; 375/240.28, 389; 348/497–544
See application file for complete search history.

(56) References Cited

U.S. PATENT DOCUMENTS

| 7,822,157 | B2 * | 10/2010 | Keller et al. ................. 375/354 |
| 7,995,143 | B2 * | 8/2011 | Christison et al. ............ 348/500 |
| 8,073,060 | B2 * | 12/2011 | Compton et al. ........ 375/240.28 |
| 2005/0259754 | A1 * | 11/2005 | Ho et al. ................. 375/240.28 |
| 2009/0175271 | A1 | 7/2009 | Tapie et al. |
| 2011/0032946 | A1 * | 2/2011 | Hardy et al. ................. 370/401 |

FOREIGN PATENT DOCUMENTS
FR         2898453        9/2007

* cited by examiner

*Primary Examiner* — Dang Ton
*Assistant Examiner* — Mewale Ambaye
(74) *Attorney, Agent, or Firm* — Jack Schwartz and Associates, PLLC

(57) ABSTRACT

The present invention relates to the domain of video equipment. It concerns more specifically a transmission device able to transmit packets, said device comprising the means to extract image ticks from a synchronisation signal, the means to initialise an image counter from said image ticks, the means to initialise a CPT_PCR counter every "m" passage through zero of the image counter, CPT_PCR producing counting ramps CSE_PCR with a range M, the means to sample the counting ramps CSE_PCR every $T_{ech}$ period, where $T_{ech}$ is from a time base synchronised on all the stations of said network, and the means to transmit packets comprising a $PCR_e$ sample of the CSE_PCR counting ramp. According to the invention, it also comprises the means to insert in the packet:—an Num index identifying the CSE_PCR counting ramp from which the $PCR_e$ sample is realised, and—a time label Datejnit indicating a CSE_PCR counting ramp timestamp passage through a reference value PCR_REF comprised between 0 and M-1.

10 Claims, 7 Drawing Sheets

TIME LABELLING ASSOCIATED WITH AN EQUIPMENT SYNCHRONISATION SYSTEM CONNECTED TO A NETWORK

This application claims the benefit, under 35 U.S.C. §365 of International Application PCT/EP09/054731, filed Apr. 21, 2009, which was published in accordance with PCT Article 21(2) on Oct. 29, 2009 in English and which claims the benefit of French patent application No. 0852687, filed on Apr. 21, 2008.

SCOPE OF THE INVENTION

The present invention relates to the domain of video equipment.

The present invention relates more particularly to a device for time labelling associated with an equipment synchronisation system connected via a packet switching network, for example of the IP (Internet Protocol) type, whether the network is wired (for example Ethernet (IEEE802.3)) or wireless (for example IEEE 802.16 D-2004).

PRIOR ART

Progress in the ability of IP networks to transport all types of signal (data or video) has made it possible to use these networks as the "backbone" architecture for video studios. Of capital importance to this change is therefore having a single infrastructure for the transport of data. Whereas in the past, several media were necessary to transport different signal types between items of equipment, the multiplexing properties offered by the IP layer enable a reduction in the number of media necessary to an IP network that links the different items of equipment.

In the prior art, the synchronisation of items of video equipment (cameras, etc.) in a studio is carried out by the transmission of a synchronisation signal commonly called "Genlock" or "Black burst". For example, the Genlock signal comprises two synchronisation signals, one is repeated every 40 ms and indicates the start of the video frame, the other is repeated every 64 µs (for a standard format and less for an HD format) and indicates the start of lines in the video frame. The waveforms of synchronisation signals are a function of the format of the image transmitted on the network. For example, for a high definition image, the synchronisation signal has a tri-level form (−300 mV, 0V, +300 mV).

When a synchronisation signal is routed to different items of equipment to be synchronised by a dedicated coaxial cable, a constant transmission time, without jitter is ensured. From such a signal, all items of equipment are able to reconstruct a timing clock that is specific to its functioning, which guarantees that its functioning is rigorously in phase with all the equipment connected to the same network. For example, two cameras synchronised by a Genlock signal circulating on a dedicated coaxial cable each generate a video with different contents but rigorously in frequency and in phase with one another.

A known disadvantage presented by an IP/Ethernet network is that it introduces a strong jitter in a transmission of signals, and particularly for the transmission of a synchronisation signal. When such a signal is routed by an IP/Ethernet connection to different items of equipment for synchronising, this jitter results in fluctuations in the length of time required for the information carried by the synchronisation signal to reach the equipment.

In the prior art, for a set of devices, for example cameras, connected to an IP network, devices are known to reconstruct at the level of each camera, a timing clock specific to each camera enabling it to overcome jitter. The underlying principle of these devices is based on a high attenuation of the synchronisation signal jitter amplitude at the level of reception. In such a way, it can be guaranteed that an image generated by a camera is rigorously in phase with all of the images generated by neighbouring cameras connected to the same network.

Examples of such video synchronisation devices for jitter attenuation are described in the international PCT application FR2007/050918, they act on program clock reference (PCR) signals that represent very accurate reference clock signals. These digital signals are sent to cameras across a network so that they can locally reconstruct clock signals that are in phase with the reference clock. The creation of the digital signal transported on the network and the reconstruction of clock signals are realised at dates according to a sampling clock $CLK_{ech}$ common to the transmission device and the reception devices. Specifically this clock $CLK_{ech}$ must be perfectly identical for the transmission device and all the reception devices.

On a network connecting several items of equipment it is of interest to transmit timing information so as to position, find, arrange or process events at equipment level according to this timing information. This function is known as "time labelling". According to the application, the precision of timing information required is variable but in all cases it is necessary that the different items of equipment be synchronised, "time labelling" is therefore complimentary to the equipment synchronisation.

A first solution to realise this time labelling function consists in using an existing IEEE1588 type network layer that offers the base of this service. Hence, each item of equipment has two registers containing timing information broken down into the form of a second register and a nanosecond register. The timing information is initialised from a predefined origin instant. This instant is commonly called EPOCH. For the IEEE1588 standard, it is fixed at 1 Jan. 1970 at 0h00 and zero seconds.

An inconvenience of this solution is that it renders dependant the video synchronisation clocks on the clocks of the IEEE1588 layer. In fact, in a 1588 environment, that can in addition be a multi-service environment, the characteristics of the clocks do not coincide with those required for video, for example 27 MHz+/−30 ppm and it is certainly preferable to assure a synchronisation that can be based on the IEEE1588 layer while at the same time being de-coupled.

The video synchronisation devices described in the international PCT application FR2007/050918 enable equipment to be synchronised with the desired level of precision but do not enable the desired time labelling function: the duration of the counting ramp produced has a duration equal to 81 seconds. The transmission of a counting ramp sample enables the current timestamp only on the ramp duration to be known precisely, which is restrictive. The transport of a single sample does not enable a timestamp to be determined without ambiguity at an instant.

One of the purposes of the present invention is to associate a time labelling service with a known device serving to synchronise items of equipment connected by a network.

SUMMARY OF THE INVENTION

The technical problem that the present invention proposes to overcome is to adapt a video synchronisation device described in the international PCT application FR2007/050918 in order to enable it to assure a time labelling service between a transmitter device delivering information permitting receiver devices connected to the same network to determine the current timestamp.

For this purpose, the present invention concerns according to a first aspect, a transmission device able to transmit packets in a packet switching network, said device comprising:
  means for extracting image ticks from a synchronisation signal,
  means for initialising an image counter from said image ticks,
  means for initialising a counter CPT_PCR at every "m" passage through zero of the image counter, the counter CPT_PCR being timed by a clock produced by the image counter and producing counting ramps CSE_PCR having a range of M,
  means for sampling the counting ramps CSE_PCR at every $T_{ech}$ period, where $T_{ech}$ is from a time base synchronised on all the devices connected over said network, and
  means for transmitting packets over the network, said packet comprising a sample $PCR_e$ of the counting ramp CSE_PCR,
According to the invention, it also comprises the means for inserting in the transmitted packet comprising the $PCR_e$ sample:
  an index Num identifying the counting ramp CSE_PCR from which the sample $PCR_e$ is realised, and
  a time label Date_Init indicating a timestamp for a passage of counting ramp CSE_PCR through a reference value PCR_REF, where the reference value PCR_REF is comprised between 0 and M-1.

The present invention relates to, according to a second aspect, a reception device comprising:
  means for receiving packets from said network, said packets containing samples $PCR_r$, said samples $PCR_r$ coming from data sampled every period $T_{ech}$, where $T_{ech}$ is from a time base synchronised on all the devices connected over said network,
  means for regenerating a counting ramp $CSR\_PCR_1$ using a phase-locked loop $PLL_1$ receiving the samples $PCR_r$, and also delivering local samples $PCR\_loc_1$ every $T_{ech}$ period and a reconstituted clock $CLK\_out_1$,
  means for initialising, at every zero-crossing of the counting ramp $CSR\_PCR_1$, an image counter CPT the rhythm of which is determined by the reconstituted clock $CLK\_out_1$,
  means for generating image ticks at every zero-crossing of said image counter CPT,
  means for reconstituting a synchronisation signal from said image ticks,
According to the invention, it also comprises:
  means for counting a number of counting ramps DSR_PCR passed since the last packet reception,
  means for extracting an index Num and a time label Date_Init from a received packet,
  means for determining information on a current timestamp from the index Num, the time label Date_Init and the value of the local sample $PCR\_loc_1$.

A first advantage of the invention is that it is based on a known equipment synchronisation equipment to realise a new function. The development of the invention was eased in that the development process was lessened.

A second advantage of the invention is that it enables a time labelling function to be realised without requiring a significant increase in data traffic on the network, as the Num index and the time label Date_Init are not necessarily joined to each packet transmitted.

BRIEF DESCRIPTION OF THE DRAWINGS

The invention will be better understood from the following description of an embodiment of the invention provided as an example by referring to the annexed figures, wherein.

DETAILED DESCRIPTION OF THE EMBODIMENTS OF THE INVENTION

Figure 1:
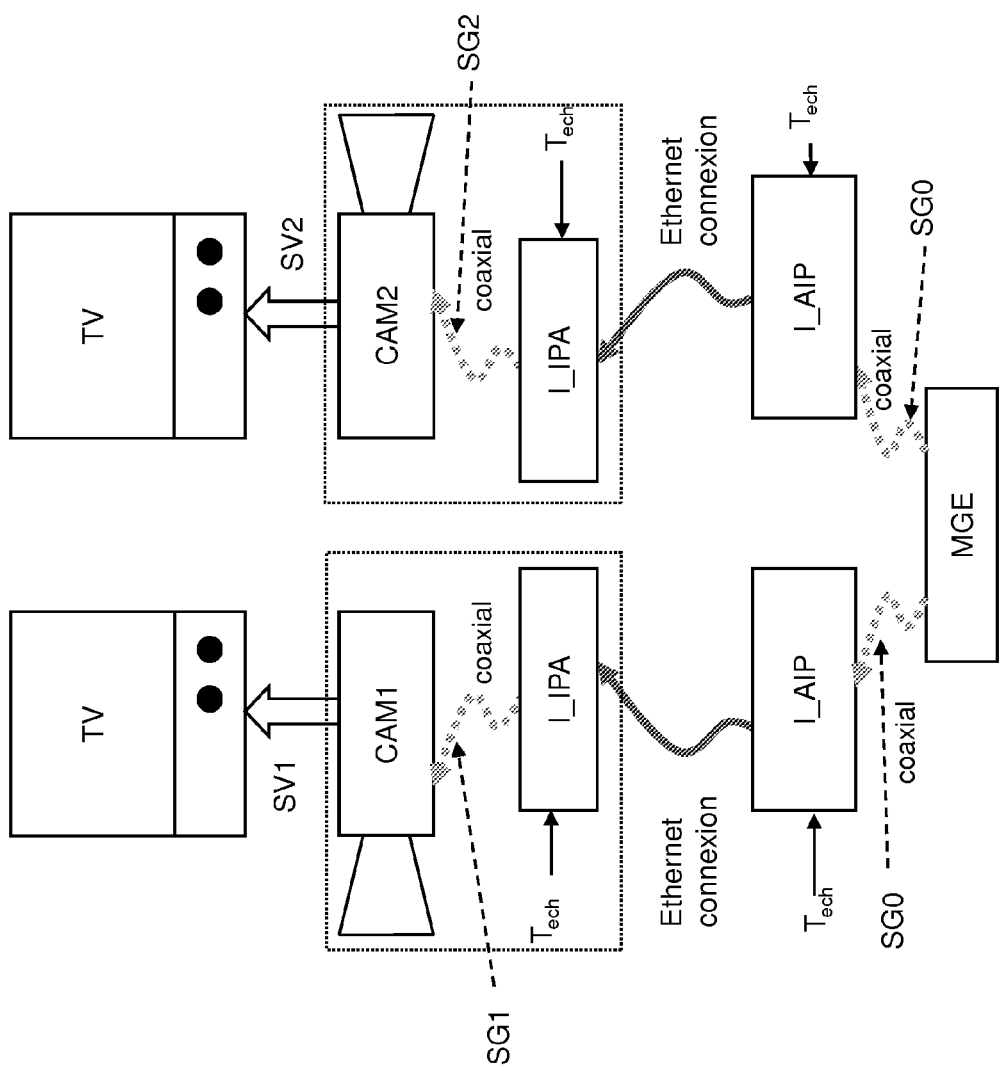
FIG. 1 shows the transmission of Genlock information between two cameras linked via an IP/Ethernet network.

The current analogue domain is interfaced with the IP/Ethernet network on the transmission side, and the IP/Ethernet network is interfaced with the analogue domain on the reception side, as illustrated in FIG. 1.

In the same figure, the transmission side comprises a "Genlock master" MGE that is connected to an IP/Analogue interface I_AIP. The Genlock master MGE sends a Genlock signal SG0 to the interfaces I_AIP.

The reception side is constituted by two cameras (CAM1, CAM2) each connected to an IP/Analogue interface I_IPA. The interfaces I_IPA that will eventually be included in the cameras themselves are responsible for reconstructing the Genlock signals SG1, SG2 intended for cameras CAM1, CAM2. The cameras CAM1, CAM2 each produce a video signal SV1, SV2 that is required to be synchronised perfectly.

The transmission and reception sides are linked together by a packet switching network that is the source of a jitter occurring in the Genlock signal SG0.

A sampling tick, in the $T_{ech}$ period, is generated from a first synchronisation layer, for example IEEE1588, and is sent to the transmission and reception sides. Indeed, the PTP protocol (Precision Time Protocol) based on IEEE1588 enables synchronisation to be obtained between the equipment connected on the Ethernet network to an order of microseconds. In other words, all the time bases of every item of equipment progress at the same time with a precision close to the order of microseconds. Each of these time bases can be used in this case to generate its own sampling tick in the $T_{ech}$ period. Use of the IEEE1588 layer is not a required route. Any system capable of providing sampling ticks to the various items of equipment on the network in the $T_{ech}$ period could be suitable. For example, a 5 ms sampling tick from a wireless transmission physical layer can be used.

Figure 2:
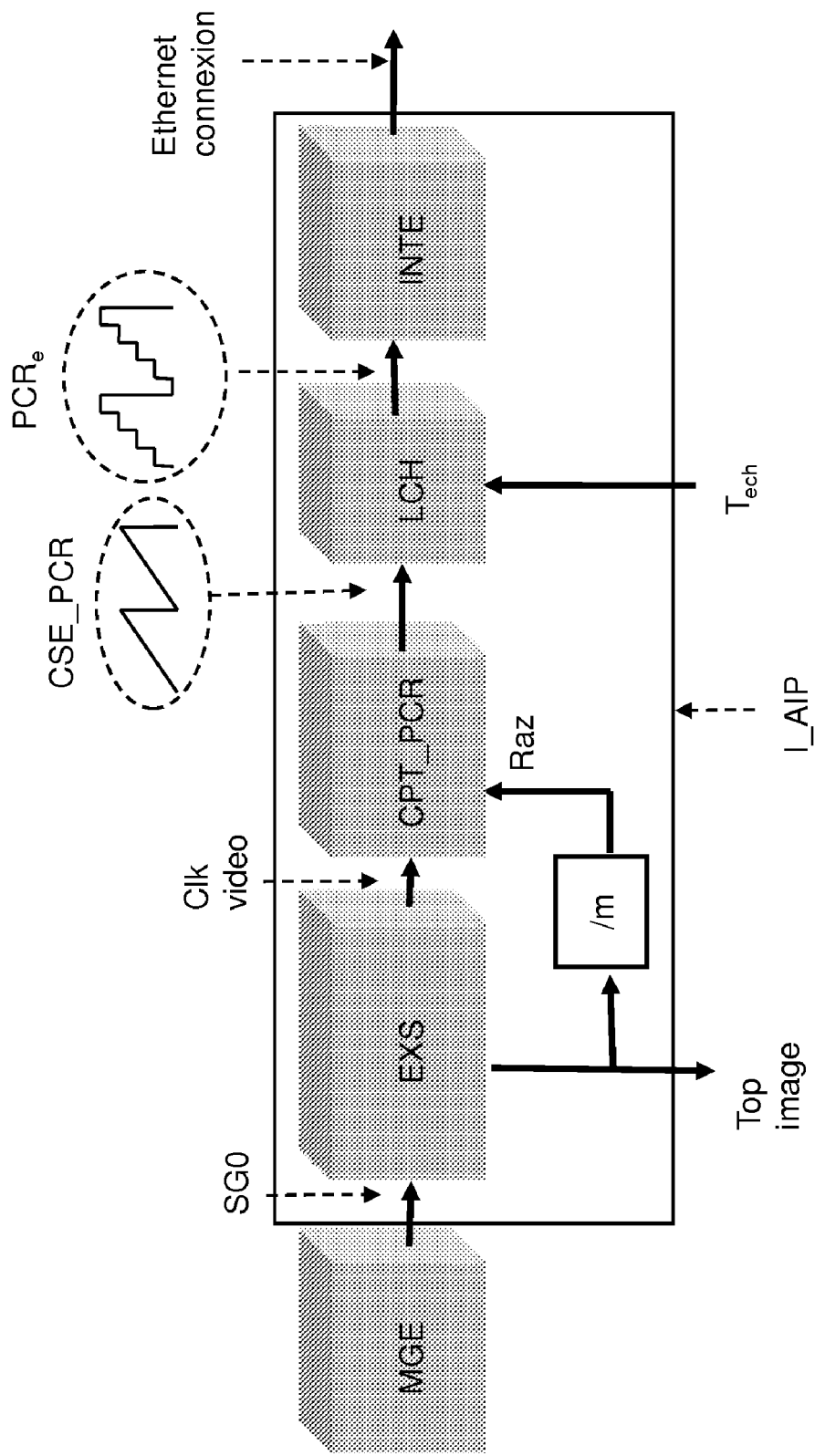
FIG. 2 shows the interfacing between the analogue domain and the IP/Ethernet network.

FIG. 2 details the processing of the Genlock signal SG0 from MGE within the interface I_AIP.

First, a module EXS extracts the synchronisation information from the signal SG0 in order to recover a video timing clock (noted as Clk on FIG. 2). More specifically, the module EXS is responsible for the generation of an image ticktick at the beginning of each image. Furthermore, the module EXS comprises an image counter, for example a 40 ms counter, which is not shown on FIG. 2. The output of this image counter progresses according to the counting ramp, crossing zero at each image period, that is to say, every 40 ms in the case of the image counter cited in the aforementioned example.

"Counting ramp" designates a stair-step signal. The steps have a unitary height (or count increment ΔC). The counting ramp range is the term applied to the difference in level between the highest step and the lowest step of the counting ramp.

The range of the counting ramp delivered by the image counter is equal to 40 ms.$F_{out}$, where $F_{out}$ is the frequency of the clock CLK video. The image counter successively delivers all of the integer values from 0 to 40 ms.$F_{out}$-1.

The video clock is used to cadence a counter CPT_PCR. The output of the counter CPT_PCR is a second counting ramp, whose period equals to m image periods. Every "m" image, the counter CPT_PCR is reset, that is to say that the second counting ramp CSE_PCR is set to 0.

The counting ramp range delivered by the image counter is equal to m.40 ms.$F_{out}$. The counter CPT_PCR delivers successively all of the integer values from 0 to m.40 ms.$F_{out}$-1.

Next, a module LCH samples the counting ramp CSE PCR every $T_{ech}$ period to produce samples $PCR_e$. These samples $PCR_e$ are sent across the network and travel to the reception side through a network interface (block INTE).

Figure 3:
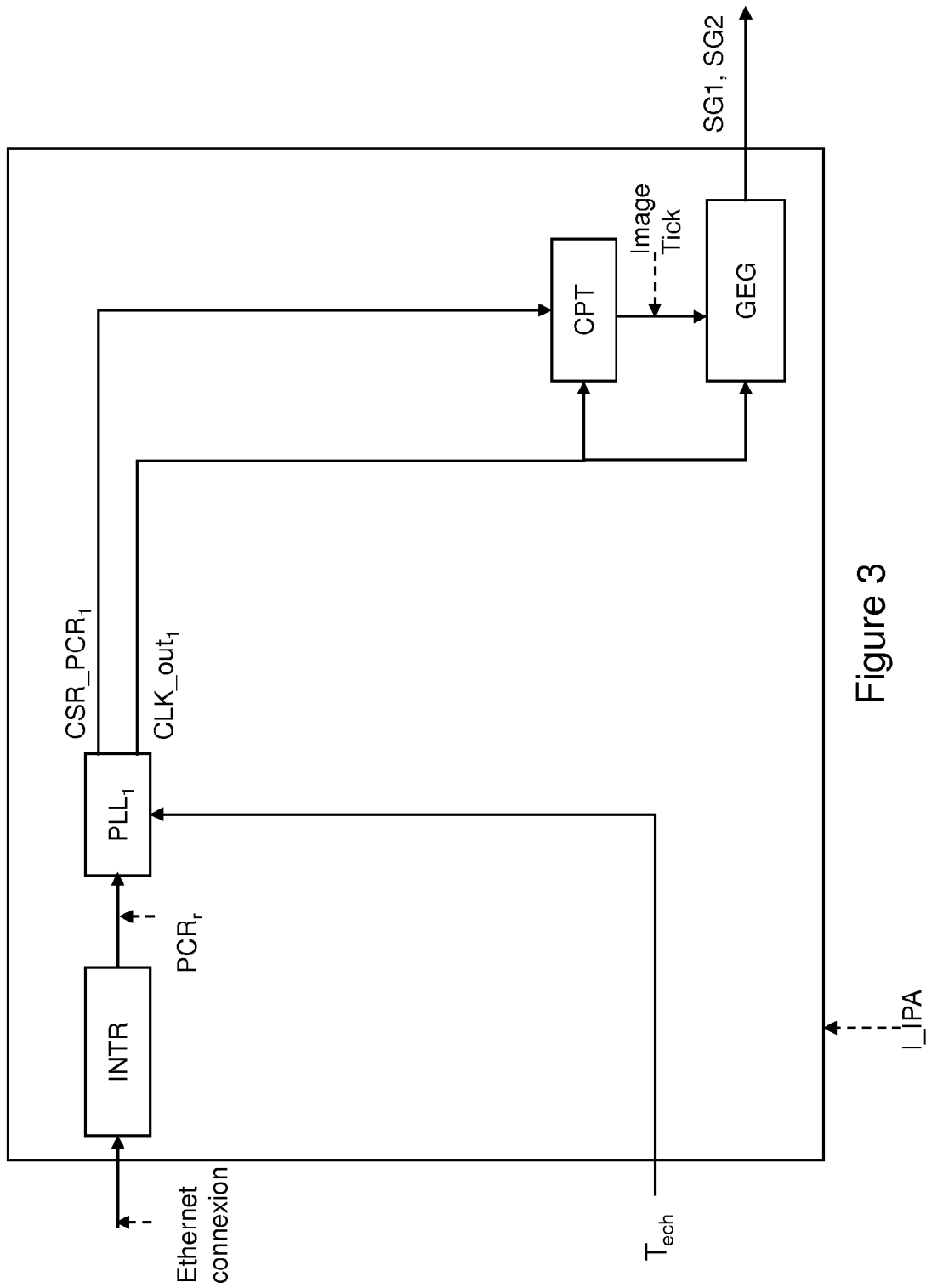
FIG. 3 shows the regeneration of the Genlock signal on the reception side according to the prior art,
  FIG. 4 diagrammatically shows a phase-locked loop architecture of a reception device according to the prior art,
  FIGS. 5a and 5b each show an operating mode of a transmission device according to the invention.

FIG. 3 shows the reception side according to the prior art. The interface I_IPA recovers the PCR samples that have been sent on the network. These samples $PCR_e$ are received by a network interface (module INTR) with a delay linked to the transport between the transmission device and the reception device: the module INTR produces samples $PCR_r$. The samples $PCR_e$, which are produced at regular $T_{ech}$ intervals on the transmission side, arrive at irregular intervals on the reception side: this is largely due to the jitter introduced during transport on the network. The samples $PCR_r$ are taken into account at regular $T_{ech}$ intervals and hence, the majority of the jitter introduced during packet transport is eliminated.

The imprecision between the transmission and reception sampling times is absorbed by a phase-locked loop $PLL_1$ whose bandwidth is appropriated. The characteristics of the phase-locked loop $PLL_1$ guarantee a reconstituted clock generation CLK_out$_1$ with a reduced jitter.

The phase-locked loop $PLL_1$ acts as a system receiving $PCR_r$ samples and delivering:
a reconstituted clock CLK_out$_1$,
a counting ramp CSR_PCR$_1$ and,
local samples PCR_loc$_1$.

When the phase locked loop $PLL_1$ operates in a steady state, the samples $PCR_r$ are noticeably equal to the samples PCR_loc$_1$.

The reconstituted clock CLK_out$_1$ cadences a CPT image counter similar to the image counter on the transmission side, for example a 40 ms counter. The image counter CPT is reset each time the counting ramp CSR_PCR$_1$ crosses 0. Between two successive resets, the image counter CPT progresses freely and produces an image tick that allows a local Genlock generator GEG to produce a reconstituted Genlock signal SG1, SG2 designed to synchronise the cameras CAM1, CAM2.

The reconstructed Genlock signal SG1, SG2 that is generated from the counting ramp CSR_PCR$_1$ and the reconstituted clock CLK_out$_1$ is in phase with the Genlock signal SG0 on the transmission side, to the nearest clock tick.

Figure 4:
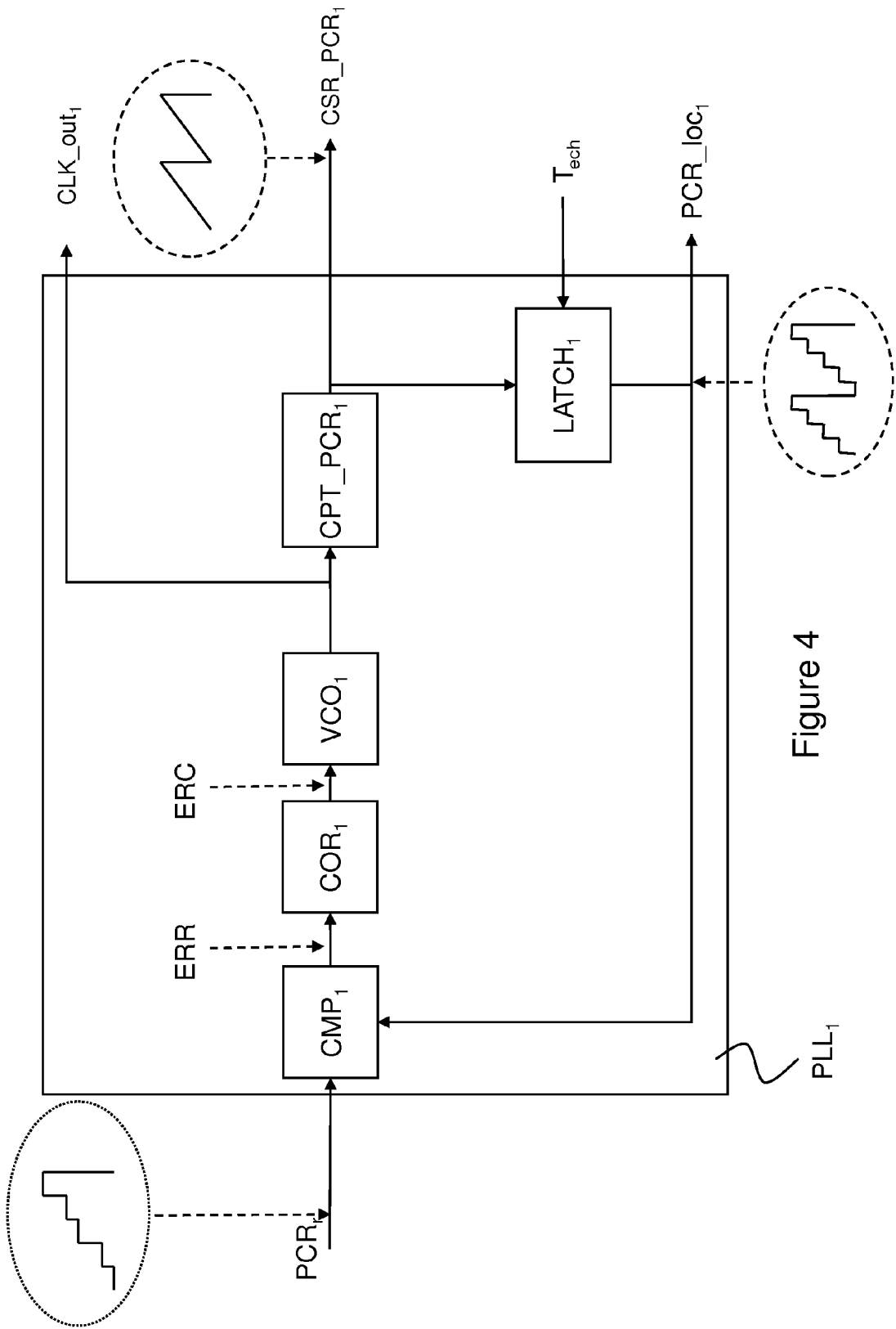

FIG. 4 diagrammatically shows a $PLL_1$ phase-locked loop architecture used in an I_IPA interface according to the prior art.

Figure 5A:
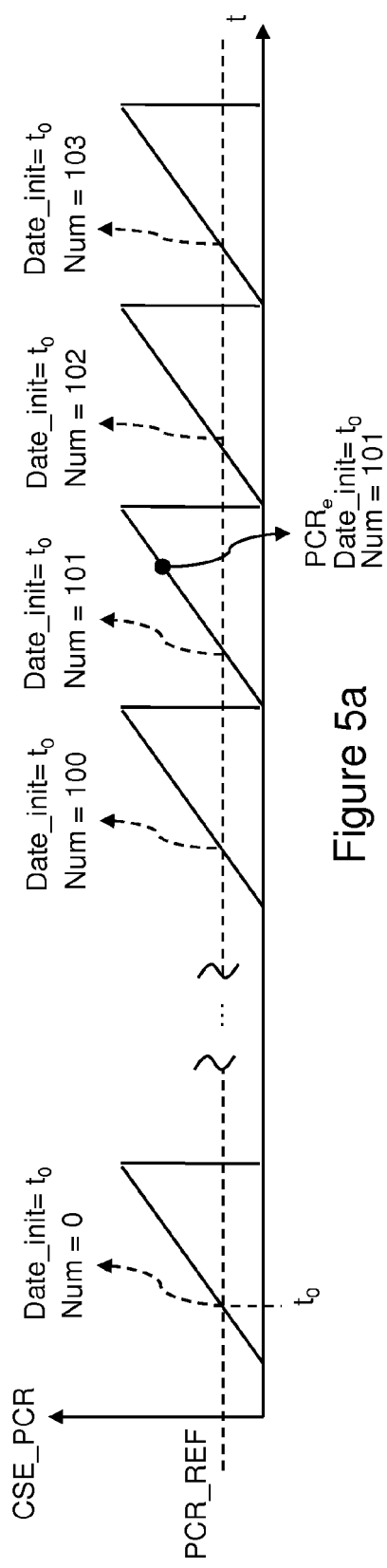
Figure 5B:
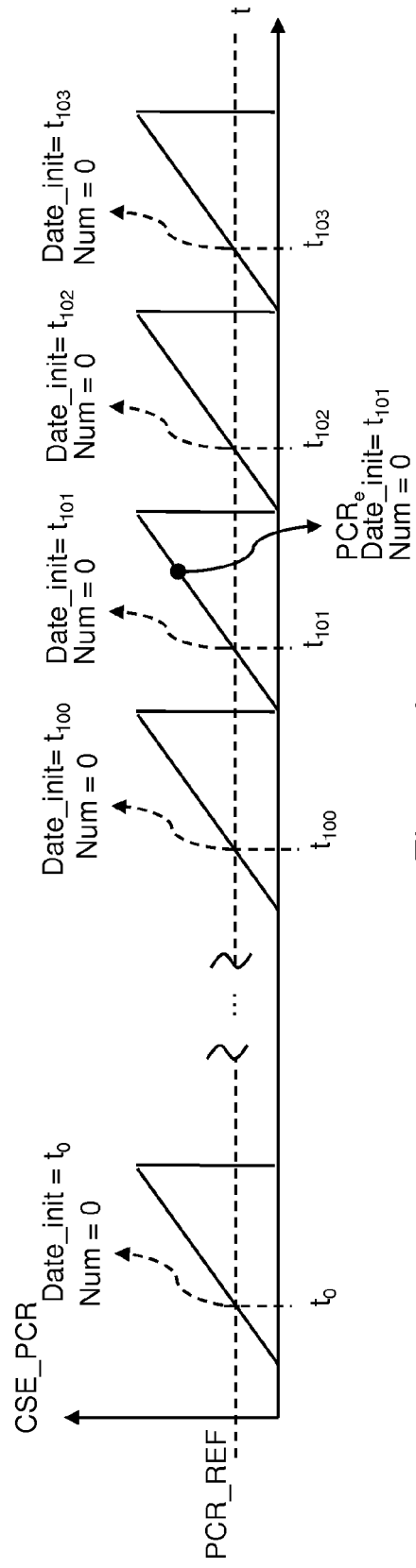

As shown in FIG. 4, the phase locked loop $PLL_1$ comprises:
a sample comparator $CMP_1$ that compares the samples $PCR_r$ and local samples delivering a comparison result of the samples, or an error signal ERR,
a corrector $COR_1$ receiving the error signal ERR and delivering a corrected error signal ERC,
a configurable oscillator $VCO_1$ receiving the corrected error signal ERC and delivering a reconstituted clock CLK_out$_1$, the clock CLK_out$_1$ has a frequency $F_{out}$ that depends on the signal ERC,
a counter CPT_PCR$_1$ that produces a counting ramp CSR_PCR$_1$ according to a rate that is printed by the reconstituted clock CLK_out$_1$,
a support system with the value LATCH$_1$ that generates local samples PCR_loc$_1$ from the values of the counting ramp CSR_PCR$_1$ at the times $T_{ech}$, FIGS. 5a and 5b show two operating modes of a transmission device according to the invention. These two figures both show the temporal progression of the counting ramp CSE_PCR produced by the EXS module.

As explained earlier, the shape of the counting ramp CSE_PCR is in the form of a saw-tooth comprising and is constituted of a uninterrupted succession of elementary counting ramps, which means that the transmission of a sample value $PCR_e$ is not sufficient on its own to identify a timestamp in a non-ambiguous way.

This is no longer the case if, in addition to the sample value $PCR_e$, is transmitted information that permits identifying in a unique manner the counting ramp, or one of the tooth, from which was the sample $PCR_e$ was realized. Given that the temporal progression of an elementary counting ramp is in the form CSE_PCR(t)=cor.t where cor is a temporal conversion coefficient giving the PCR value according to the timestamp t. Knowing the sample value $PCR_e$ one calculates easily the timestamp t value by the expression $PCR_e$/cor.

This information can take the form of a pair (Date_Init, Num) where Date_Init is a time label indicating a timestamp of passage of the counting ramp CSE_PCR through a reference value PCR_REF comprised between 0 and M-1 and where Num is an index identifying a number of counting ramps following the given date Date_Init.

FIG. 5a shows a first operating mode of a transmission device according to the invention that inserts pairs (Date_Init, Num) in the transmitted packets and for which:
the value of the time label Date_Init is determined from the timestamp at which the CSE_PCR counting ramp reaches the reference value PCR_REF for the first time. The value of Date_Init is constant,
the Num index is reset, i.e. set to zero, and is incremented at each passage of the CSE_PCR counting ramp through the reference value PCR_REF.

FIG. 5b shows a second operating mode of a transmission device according to the invention for which:
the value of the time label Date_Init is determined from the timestamp of each passage of the CSE_PCR counting ramp through the reference value PCR_REF,
the Num index has a constant value.

Hereafter the value of Num will be considered to be nul.

The second operating mode is the preferred operating mode as it enables the drifts between a clock producing the time label Date_Init and the video clock to be overcome.

Figure 6:
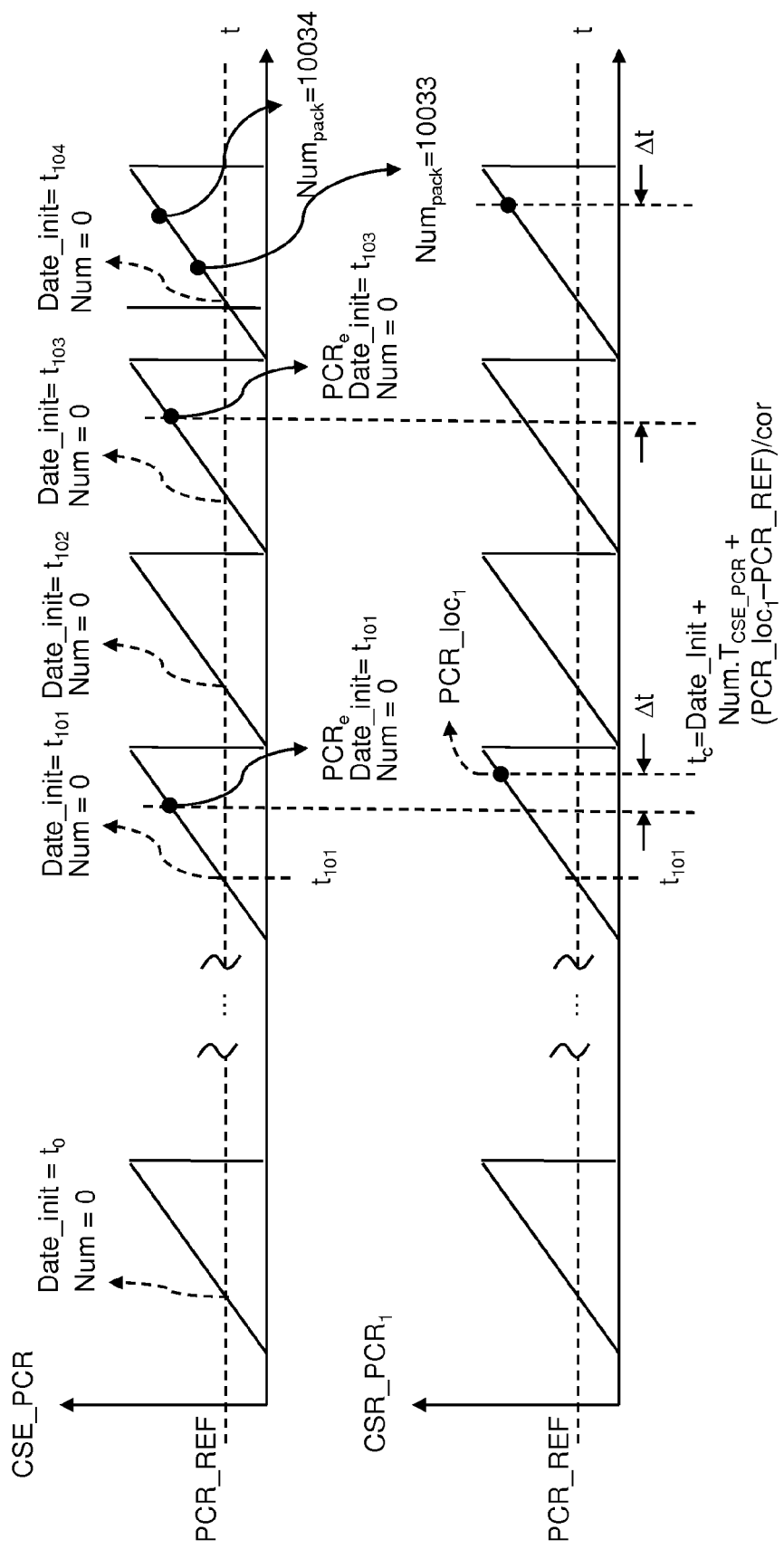
FIG. 6 shows the manner in which the current timestamp is determined by a reception device from information inserted in the packets transmitted by a transmission device according to the invention operating according to the second operating mode.

FIG. 6 is similar in its upper part to FIG. 5b and in its lower part shows the temporal progression of a counting ramp $CSR\_PCR_1$ generated on a reception device receiving in a packet: the sample $PCR_e$, the index Num and the time label Date_Init.

In continuous rate, the counting ramps CSE_PCR and $CSR\_PCR_1$ are perfectly in phase. The values of Num and Date_Init are associated with the local sample value $PCR\_loc_1$. Those various values enable determination on demand of the current timestamp $t_c$ marking the date at which $PCR\_Loc_1$ is realised by means of the following expression:

$$t_c = \text{Date\_Init} + \text{NUM} \cdot T_{CSE\_PCR} + (PCR\_loc_1 - PCR\_REF)/cor$$

where $T_{CSE\_PCR}$ is the value of the period of the counting ramp CSE_PCR.

In the example shown in FIG. 6, the current timestamp is requested on the timestamp $t_{101} + \Delta t$ where $\Delta t$ is unknown a priori.

$t_c$ can be determined on condition that each reception device according to the invention knows the value of PCR_REF.

However, there are situations in which knowledge of Num and Date_Init does not suffice to determine the current timestamp $t_c$.

Consider for example the example shown in FIG. 6, where a sample $PCR_e$ is transmitted in a packet simultaneously with Num=0 and Date_Init=$t_{103}$. In this example, the timestamp at which it is requested to establish the current timestamp ($t_{103} + \Delta t$), the considered local sample on the reception side is realised on a "saw-tooth" or rather "counting ramp" that is not that which corresponds to that on which was realised $PCR_e$. There is therefore an ambiguity that could be removed, if the number of counting ramps or teeth, that have passed since the last reception of a packet was known.

It is particularly for overcoming this type of problem that the reception device comprises means for determining the number of counting ramps that have passed since the last reception of a packet. This determination can be done specifically by numbering the counting ramps that have succeeded each other since the last packet reception.

This numbering can be realised by counting the number of passages of the counting ramp CSR_PCR through value PCR_REF. It can also be realised by determining the duration separating from it the instant where the current timestamp is requested or the sample $PCR_e$ is realised.

Advantageously, means for counting a counting ramp number use an index $Num_{pack}$ numbering the received packets.

Advantageously, the transmission device comprises means for inserting in a transmitted packet an index $Num_{pack}$ identifying the transmitted packet.

The $Num_{pack}$ index is stored in a register having a length equal to K bits.

Advantageously, the $PCR_e$ samples are realised each time the remainder of a Euclidian division of the value of the time base by $T_{ech}$ equals zero and in that the value of the $Num_{pack}$ index is determined as equal to the remainder of a Euclidian division of the value of the time base by $2^K$.

In this specific case where the time base is an IEEE1588 counter of period $T_{ech}$ equal to 1 second. The $PCR_e$ sampling instant is defined for example like the timestamp of the passage to a second of the IEEE1588 counter, that is to say, the instant where the nanosecond counter indicates 0. It is proposed in order to obtain a $Num_{pack}$ value by calculating a division of the value of the second counter by the modulo of the packet count to obtain the current packet number. This number is incremented at each packet sent to each packet.

Advantageously, the packet number is inserted in each transmitted packet.

A second advantage provided by the combination of a transmission of information giving the number of a transmitted packet and a convention defining the sampling instant on transmission in liaison with a time base value is to very simply provide a timestamp corresponding to the instant when the $PCR_e$ sample was realised.

A third advantage consists in the realisation of a measurement of the duration of transport of each packet.

A last advantage flowing from the first advantages, is to be able to easily implement an under-sampling of received packets. Under-sampling the reception of packets enables the easy reduction of the regulation frequency of the receiver, for example for the purpose of better filtering of the jitter towards the lower frequencies.

It is preferable that each reception device according to the invention can determine a current timestamp $t_c$ according to a selected specific representation mode (such as for example UTC, frame number, etc.).

To do this, it is necessary that the reception device comprises a coefficient value cor describing the temporal progress of the counting ramp according to the representation mode selected, that it has a value of $T_{CSE\_PCR}$ according to this same representation mode and that finally it can extract a label value Date_Init according to this same representation mode.

Advantageously the time label Date_Init is expressed according to at least one representation mode.

Advantageously, a representation mode of the time label is the "Universal Time Coordinated" (UTC) mode.

Advantageously, a representation mode of the time label corresponds to a frame number.

Preferably, the reference value PCR_REF is equal to 0 and cannot be modified.

Advantageously, the transmission device according to the invention also comprises a clock that produces the time label Date_Init.

Advantageously, the transmission device according to the invention receives the value of the time label Date_Init from a clock equipping a device connected to the network other than said transmission device.

Figure 7:
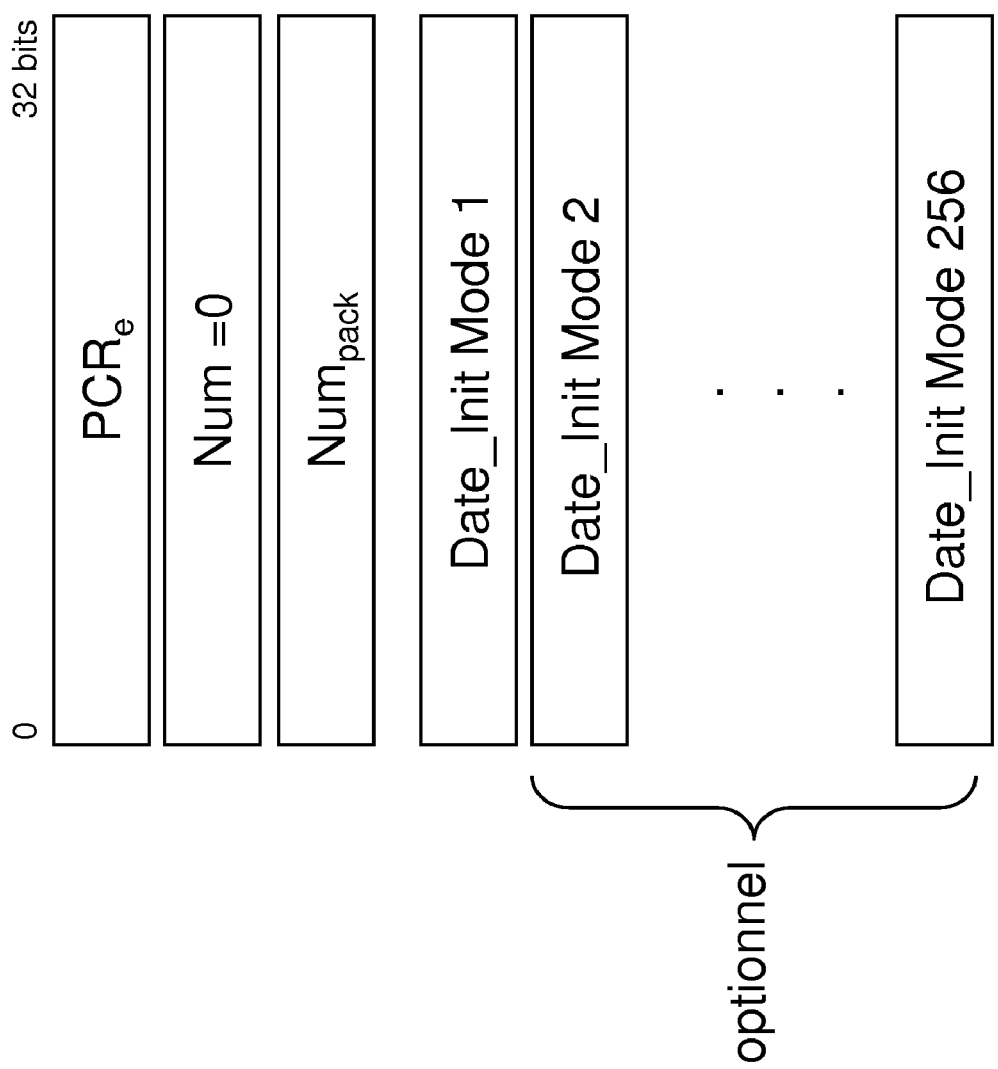
FIG. 7 shows an example of packet structure comprising a Num index and a time label Date_Init transmitted by a transmission device according to the invention.

Finally, FIG. 7 shows an example of the structure of a packet comprising a pair (Date_Init, Num) corresponding to the preferred operating mode. This packet comprises a minimum of 4 fields of 32 bits and can comprise up to 259. A first field of 32 bits contains a $PCR_e$ sample value. A second field contains the index value Num that is constant and preferably equals 0. A third field contains an index identifying the packet transmitted in a unique way. The index is incremented at each new packet, it is determined like the rest from a Euclidian division of the value of the second counter by the K packet count modulo.

A fourth field contains a time marker value Date_Init updated at each passage of the counting ramp CSE_PCR through the reference value PCR_REF according to a first representation mode.

The 255 fields that follow are optional and can hold Date_Init time label values according to representation modes adapted to the different potential reception devices.

Advantageously, the PCR_REF value is also inserted in the packets with the Num indexes and the Date_Init time labels.

The temporal frequency with which the packets comprising Num, Date_Init and possibly PCR_Ref are transmitted on the network is adapted so that a reception device added to the network does not remain too long without receiving a time label. For example for a value $T_{CSE\_PCR}$ equal to 80 seconds, and a period $T_{ech}$ equal to one second, the transmission period of packets comprising Num and Date_Init is equal to 10 seconds for example.

The invention is described in the preceding text as an example. It is understood that those skilled in the art are capable of producing variants of the invention without leaving the scope of the patent.

The invention claimed is:

1. Transmission device able to transmit packets in a packet-switching network connecting at least two devices, said network introducing jitter to the transmitted packets resulting in fluctuations in the length of transmission time for the packets, said device comprising: means for initializing an image counter from said image ticks, means for initializing a counter at every "m" passage through zero of the image counter, m being a positive integer different from zero, the counter being timed by a clock produced by the image counter and producing counting ramps having a range of m, means for sampling the counting ramps at every Tech period, where Tech is from a time base synchronized on the at least two devices connected over said network, and means for transmitting packets over the network, said packet comprising a sample of the counting ramp, wherein it also comprises means for inserting in the transmitted packet comprising the sample: an index identifying the counting ramp from which the sample is realized, and—a time label indicating a timestamp for a passage of counting ramp through a reference value, where the reference value is comprised between 0 and m-1, said index and time label being used in synchronizing devices connected by the network.

2. Transmission device according to claim 1, wherein the index is initialized at zero and is incremented at each passage of the counting ramp through the reference value and in that the value of the time label is determined from the timestamp at which the counting ramp reaches the reference value for the first time.

3. Transmission device according to claim 1, wherein the value of the time label is determined from the timestamp of each passage of the counting ramp through the reference value and in that the index has a constant value.

4. Transmission device according to claim 3, wherein the time label is expressed according to at least one representation mode.

5. Transmission device according to claim 4, wherein a representation mode of the time label is the UTC mode.

6. Transmission device according to claim 1, wherein it also comprises means for inserting in the transmitted packet an index identifying the transmitted packet.

7. Transmission device according to claim 6, the index Numpack being stored in a register having a length equal to K bits, wherein the samples are carried out each time the remainder of a Euclidian division of the value of the time base by $T_{ech}$ equals zero and the value of the index is determined as equal to the remainder of an Euclidian division of the value of the time base by $2^K$.

8. Transmission device according to claim 1, wherein the reference value is inserted in the transmitted packets comprising an index and a time label.

9. Reception device able to receive packets from a packet switching network, the network introducing jitter to the transmitted packets resulting in fluctuations in the length of transmission time for the packets, said device comprising: means for receiving packets from said network, said packets containing samples, said samples coming from data sampled every period Tech, where Tech is from a time base synchronized on all the devices connected over said network, means for regenerating a counting ramp using a phase-locked loop receiving the samples, and also delivering local samples every Tech period and a reconstituted clock, means for initializing, at every zero-crossing of the counting ramp, an image counter the rhythm of which is determined by the reconstituted clock, means for generating image ticks at every zero-crossing of said image counter, and means for reconstituting a synchronization signal from said image ticks, wherein it also comprises: means for counting a number of counting ramps passed since the last packet reception, means for extracting an index and a time label from a received packet, means for determining information on a current timestamp from the index, the time label and the value of the local sample, said index and time label being used in synchronizing devices connected by the network.

10. Reception device according to claim 9, wherein the means for counting a number of counting ramps uses an index identifying the received packets.

* * * * *

UNITED STATES PATENT AND TRADEMARK OFFICE
CERTIFICATE OF CORRECTION

PATENT NO. : 8,363,651 B2
APPLICATION NO. : 12/736566
DATED : January 29, 2013
INVENTOR(S) : Thierry Tapie et al.

It is certified that error appears in the above-identified patent and that said Letters Patent is hereby corrected as shown below:

In the Claims

Column 9, lines 10-31, Claim should read:

1. Transmission device able to transmit packets in a packet-switching network connecting at least two devices, said network introducing jitter to the transmitted packets resulting in fluctuations in the length of transmission time for the packets, said device comprising:
means for extracting image ticks from a synchronization signal,
means for initializing an image counter from said image ticks,
means for initializing a counter at every "m" passage through zero of the image counter, m being a positive integer different from zero, the counter being timed by a clock produced by the image counter and producing counting ramps having a range of m,
means for sampling the counting ramps at every Tech period, where Tech is from a time base synchronized on the at least two devices connected over said network, and
means for transmitting packets over the network, said packet comprising a sample of the counting ramp, wherein it also comprises means for inserting in the transmitted packet comprising the sample:
 an index identifying the counting ramp from which the sample is realized, and
a time label indicating a timestamp for a passage of counting ramp through a reference value, where the reference value is comprised between 0 and m-1, said index and time label being used in synchronizing devices connected by the network.

Signed and Sealed this
Twentieth Day of August, 2013

Teresa Stanek Rea
*Acting Director of the United States Patent and Trademark Office*